UNITED STATES PATENT OFFICE.

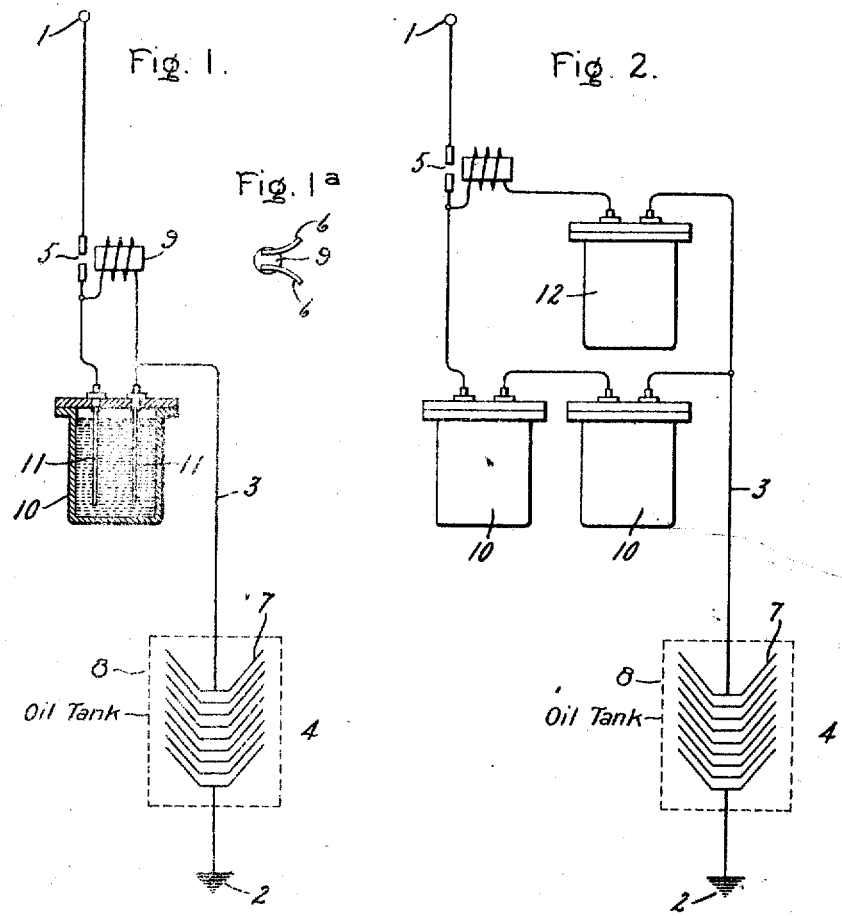

ELMER E. F. CREIGHTON, OF SCHENECTADY, NEW YORK, ASSIGNOR TO GENERAL ELECTRIC COMPANY, A CORPORATION OF NEW YORK.

ELECTROLYTIC LIGHTNING-ARRESTER WITH GAP AND BLOW-OUT.

1,004,536.

Specification of Letters Patent. Patented Sept. 26, 1911.

Application filed September 2, 1908. Serial No. 451,302.

*To all whom it may concern:*

Be it known that I, ELMER E. F. CREIGHTON, a citizen of the United States, residing at Schenectady, county of Schenectady, State of New York, have invented certain new and useful Improvements in Electrolytic Lightning-Arresters with Gaps and Blow-Outs, of which the following is a specification.

This invention relates to devices for protecting alternating current transmission lines from the destructive effects of lightning, either transitory or continual, and it has especial reference to arresters of the electrolytic type. These arresters are usually placed in series with a spark-gap of the horn type, and it is found that if the gap is set at the lowest value at which a destructive discharge is likely to occur, the spark or arc may persist, refusing to rise on the horns. The present invention is designed to remedy this trouble, and it consists in shunting an aluminum cell across an electromagnet in series with the gap, the magnet being so located with reference to the gap that its field will blow out the arc. The cell permits the high frequency lightning discharge to pass through it, thereby protecting the windings of the electromagnet. But the following low frequency dynamic current is forced to flow through and energize the magnet.

In the accompanying drawing, Figure 1 shows diagrammatically an electrolytic arrester in series with a spark-gap having a blow-out magnet in shunt to a single aluminum cell; Fig. 1ª shows the horns at the gap, and Fig. 2 is another diagram showing means for magnifying the current in the electromagnet.

The line 1, which is a conductor carrying an alternating current, is connected to ground at 2 by a circuit 3, in which is included an electrolytic lightning arrester 4 in series with a spark-gap 5 having horns 6. The arrester is preferably composed of a tier of aluminum cups or cells 7 containing an electrolyte and immersed in an oil-tank 8. An electromagnet 9 is inserted in the circuit between the arrester 4 and the spark-gap 5, said magnet being so positioned with reference to the gap that its magnetic field is transverse to the horns of said gap. In shunt to said electromagnet is connected a device responsive to high frequency currents only. In Fig. 1 this device is shown as a single cell 10 containing a volume of electrolyte and two aluminum electrodes 11.

The drop in potential across the magnet depends upon the resistance of the cell 10, which at normal potential is high, but for potentials above the normal it is low so that the impedance to the lightning discharge is sensibly *nil*. A discharge of lightning across the spark-gap will, therefore, be taken by the cell, the self-induction of the electromagnet preventing it from being traversed by such a current. When the low-frequency dynamic current follows through and develops an arc across the gap, the cell opposes the passage of said current and the greater portion is shunted through the electromagnet, generating a field of force which at once displaces the arc. In other words, the current in the electromagnet depends directly on the potential across the magnet and inversely on the frequency, while the current in the shunting cell depends directly on the potential across the cell and also directly on the frequency.

The arrangement shown in Fig. 2 is designed to magnify the current in the electromagnet. An element having capacity, such as an aluminum cell 12, is connected in series with the electromagnet, the capacity being calculated to neutralize or almost neutralize the inductance of the electromagnet at generator frequency. Two shunting cells 10 are used, connected in series, and allowing a free discharge of high-frequency currents and high potentials only. In this arrangement, as in Fig. 1, the high-frequency discharge passes freely through the shunting cells 10, but the low-frequency dynamic current is shunted through the electromagnet, creating a magnetic field which blows out the arc at the spark-gap. Since the self-inductance of the magnet is substantially balanced by the capacity of the cell 12 at generator frequency, the resistance of the magnet circuit follows Ohm's law, and as the ohmic resistance is not high the current will be greater than in Fig. 1.

What I claim as new and desire to secure by Letters Patent of the United States, is,

1. A protective device for electric circuits comprising a discharge gap, an inductive device mounted to form a magnetic blowout for said gap and in series with said device a condenser proportioned to balance the self inductance of said device at the normal frequency of the circuit to be protected.

2. A protective device for electric circuits comprising a discharge gap, an electromagnet mounted to form a magnetic blowout for said gap, and an electrolytic condenser connected in series with said electromagnet and proportioned to have sufficient capacity to balance the self inductance of said electromagnet at the normal frequency of the circuit to be protected.

3. In a protective device, a discharge path comprising a spark gap, and means in series with said gap forming a discharge path responsive to oscillations of abnormal frequency and potential, of an electromagnetic blowout device for said gap and connected in series with said gap, and a condenser connected in series with said device and in shunt to said means, said condenser being proportioned to balance the self inductance of said inductive device at the normal frequency of the circuit to be protected.

4. A protective device comprising electrodes separated to form a spark gap, an electromagnet connected in series with said electrodes and mounted to form an electromagnetic blow-out for said gap, and means connected to said electromagnet for substantially balancing the self-inductance of said magnet.

5. The combination with a conductor of an alternating current system, of a protective device comprising electrodes separated to form a spark gap, one of said electrodes being connected to said conductor, an electromagnetic blow-out for said gap connected in series with said electrodes, and a condenser connected in series with said electromagnetic blow-out and proportioned to balance the self-inductance of said electromagnetic blow-out at the normal frequency of the current on said conductor.

6. The combination with a conductor of an alternating current system, of electrodes separated to form a spark gap, one of said electrodes being connected to said conductor, an electromagnetic blow-out for said gap connected in series with said electrodes, and an aluminum cell in series with said electromagnetic blow out and having capacity to balance the self inductance of said electromagnetic blow-out at normal frequency of the current on said conductor.

7. A protective device comprising an electrolytic cell, electrodes connected in series with said cell and separated to form a spark gap, an electromagnetic blow-out for said gap connected in series with said electrodes, and an electrolytic condenser connected in series with said spark gap and said electrolytic cell and in shunt to said electromagnetic blow-out.

8. The combination with an electrolytic cell, of electrodes in series therewith and separated to form a spark gap, an electromagnetic blow-out for said gap in series with said electrodes, a condenser connected in series with said electromagnetic blow-out, and a shunt responsive only to high frequency current and to abnormally high potential connected in series with said spark gap and in parallel to said electromagnetic blow-out and said condenser.

In witness whereof, I have hereunto set my hand this 31st day of August, 1908.

ELMER E. F. CREIGHTON.

Witnesses:
BENJAMIN B. HULL,
MARGARET E. WOOLLEY.